United States Patent [19]

Murdock

[11] 4,249,317
[45] Feb. 10, 1981

[54] SOLAR DRYING APPARATUS AND PROCESS FOR DRYING MATERIALS THEREWITH

[76] Inventor: James D. Murdock, Ten Manchester Rd., Moylan, Pa. 19065

[21] Appl. No.: 91,049

[22] Filed: Nov. 5, 1979

[51] Int. Cl.³ ............................................. F26B 3/28
[52] U.S. Cl. ............................... 34/93; 203/DIG. 1; 159/1 S
[58] Field of Search ................ 203/DIG. 1; 202/175; 159/1 S; 34/93, 237

[56] References Cited

U.S. PATENT DOCUMENTS

| | | | |
|---|---|---|---|
| 1,364,477 | 1/1921 | Bigand | 34/93 |
| 3,894,345 | 7/1975 | Zeltmann | 34/93 |

FOREIGN PATENT DOCUMENTS 454558  9/1936  United Kingdom ..................... 159/1 S Primary Examiner—Larry I. Schwartz
Attorney, Agent, or Firm—Omri M. Behr

[57] ABSTRACT

A solar drying apparatus for removing the moisture from granular materials, sludge, or the like which utilizes the sun's rays and convection air currents includes an angled surface for retaining a layer of the material to be dried and a transparent cover disposed above the surface for permitting convection air currents to flow therebetween. A raking device disposed between the surface and the transparent cover causes displacement of the drying material thereby causing it to move slowly down the angled or inclined surface. A feed mechanism is disposed at the upper edge of the angled surface to insure a continuous flow of raw material and a removing device is disposed proximate the lower edge of the angled surface to continuously remove the dried material from the drying apparatus.

25 Claims, 3 Drawing Figures

SOLAR DRYING APPARATUS AND PROCESS FOR DRYING MATERIALS THEREWITH

BACKGROUND OF THE INVENTION

1. Field of the Invention

The present invention relates to solar drying devices and in particular, to a device which may be utilized to remove the moisture content of granular materials, sludge, or the like.

2. Description of the Relevant Art

The use of solar induced convection currents to dry material such as fruits, grains, sludge and the like has been well recognized in the art. These devices include but are not limited to a surface upon which the material to be dried is placed. The sun's rays are focused thereon by means of mirrors, lenses and other reflecting devices to direct the sun's rays onto the material for drying. Inclined planes have also been used to direct the flow of air currents over the material to be dried or, alternatively, the material itself may be placed on an inclined plane so that it may face the sun's rays directly.

Other types of solar collectors use the chimney effect created by the heated air under an inclined glass panel. Generally, these devices heat either air or water which is further circulated to transport the heated matter to another area where the heat is used.

Applications for drying sludge by solar heat are recognized. Generally they require that the sludge be placed into large, open pools where the sun's rays help in the drying process. Additionally, further improvements in this process include raking the sludge to bring the dried portions thereof to the surface to aid in the removal of moisture therefrom. However, all of the known techniques had inherent disadvantages associated therewith.

The present invention overcomes the shortcomings found in the prior art by providing a drying process wherein the material itself is dried on an inclined support means utilizing convection induced evaporation and a materials handling system which includes a means of providing a continuous supply and continuous removal of the material. A novel feature of the present invention is the inclusion of a means of agitating or raking the material while it dries on said support surface to both re-expose wet material and transport the same with the help of gravity from the upper edge of said inclined surface to the bottom edge thereof.

SUMMARY OF THE INVENTION

Solar drying is one way of effectively using the sun's radiation. The evaporation of moisture from a wet granular material, lignite, mechanically dewatered coal slurry, sewage sludge, agricultural waste products, or the like, prior to combustion effectively increases the fuel value of that material. Using a dryer to remove the moisture from materials, fruit, agricultural grains, fish meal, wet crushed minerals, or the like, where the material is not to be burned but where conventional dryers are typically used, saves a large portion of the energy that would have been used to fire these conventional dryers.

This southward facing, covered, inclined plane, solar dryer configuration benefits from the natural convective airflow generated directly adjacent to a surface facing the sun. Evaporation rate is a function of airflow and convective airflow increases the steeper the incline. Covering the inclined surface with a transparent membrane while allowing air to flow between these two surfaces further increases the evaporation rate and hence the effectiveness of the device. By covering the material surface or bed the device can take advantage of both the chimney effect and the greenhouse effect, the former by virtue of having a heated enclosed space open at top and bottom, and the latter by virtue of the fact that the cover is transparent to solar radiation but opaque to radiation reemitted from the exposed wet material surface. The inclined plane configuration is further desirable because of the small amount of energy required to move the material to be dried down the slope while continuously reexposing wetter material to facilitate evaporation. Finally, an inclined plane configuration facing south (or north in the southern hemisphere) is superior to a conventional horizontal drying bed since the incident solar radiation is more nearly normal to the wet material surface.

A solar drying apparatus for drying granular materials, sludge, or the like utilizing the sun's rays and convection air current, according to the principles of the present invention, comprises bed means disposed at an angle from the horizontal for retaining a layer of the material to be dried, cover means disposed a predetermined amount above the bed means to provide a free flow of the air currents therebetween, the cover means being transparent to the sun's rays. Additionally included, are means disposed between the cover means and the bed means for piercing the upper portion of the material layer causing a portion of the material to move slowly down the incline of the bed means. A removing means disposed proximate the lower edge of the bed means removes the dried material as it appears there and a feed means, disposed proximate the upper edge of the bed means supplies additional wet material as the material moves away therefrom.

A process for drying granular materials, sludge or the like utilizing the sun's rays and convection air currents, according to the principle of the present invention, comprises the steps of; providing an inclined surface disposed at an angle from the horizontal for supporting a material to be dried; providing a transparent cover means disposed above the inclined surface; feeding material to be dried to the upper edge of the inclined surface; providing piercing means disposed between the transparent cover and the support surface for piercing the material as it moves transverse to the inclined support surface and removing the dried material from the lower edge of the support surface.

In order that the invention may be more fully understood, it will now be described, by way of example, with reference to the accompanying drawing.

DESCRIPTION OF THE PREFERRED EMBODIMENT

Figure 1:
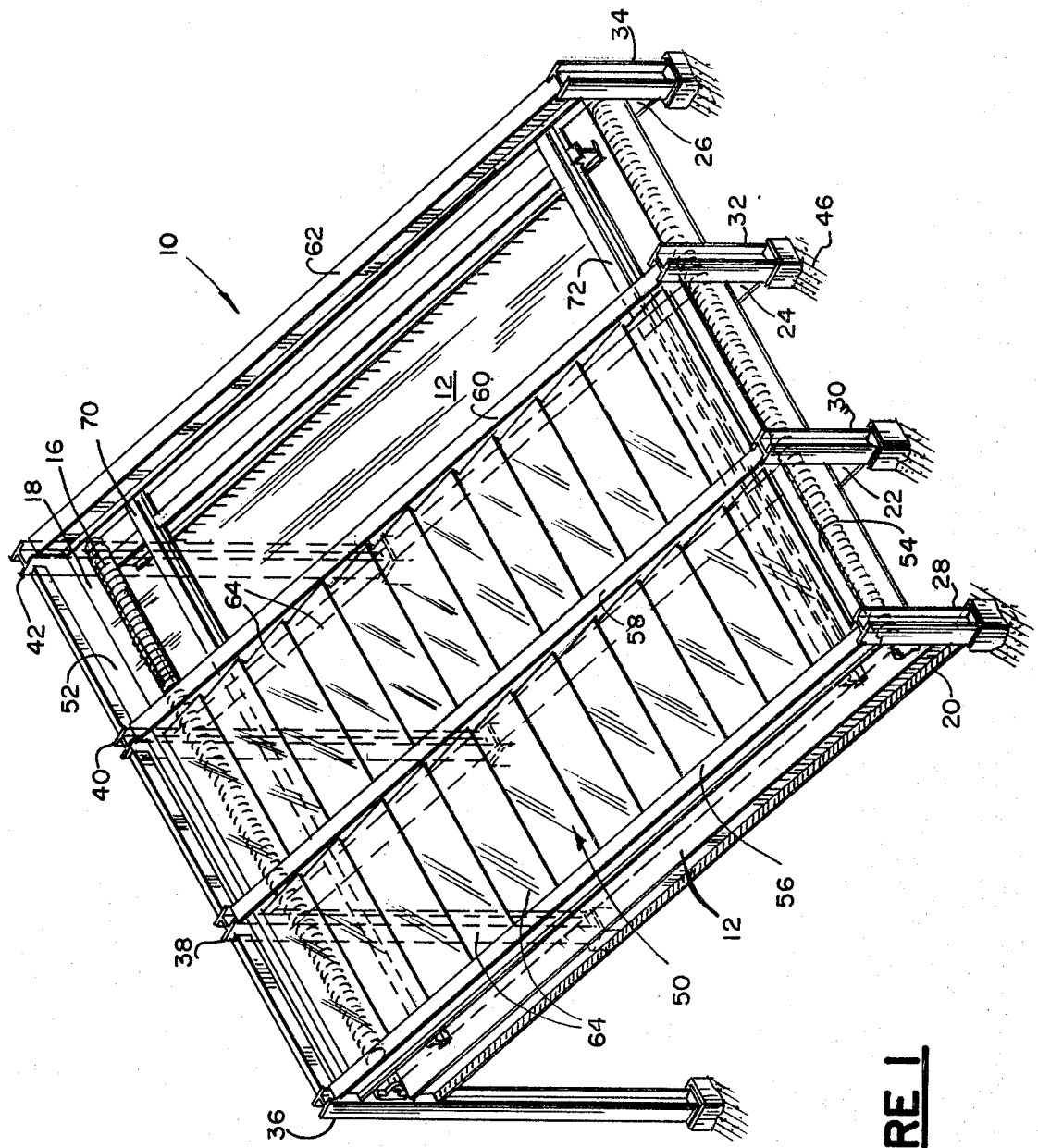
FIG. 1 is an isometric pictorial representation of a solar drying apparatus, according to the principles of the present invention, with a portion of the transparent cover removed for clarity.

We refer now to the figures and in particular to FIG. 1 which shows a preferred embodiment of a solar drying apparatus 10 that may be used for drying granular materials, sludge, or the like. The solar dryer serves as an intermediate step between mechanical dewatering and waste heat drying. The solar drying effectively utilizes the sun's rays to evaporate the moisture from a material saturated therewith. The present solar dryer, although suitable for drying numerous materials, is specifically adapted for removing a large portion of the water content of sludge before its being used in a combustion process.

The solar drying apparatus 10 is provided with a lower support surface or bed 12 which is inclined from the horizontal at an angle $\phi$. The material 14 to be dried (see FIG. 2) is fed on to the surface 12 by means of a troughless screw conveyor 16 disposed proximate the upper edge 18 of the support surface 12. Additional material to be dried is fed to the screw conveyor 16, via a conventional storage or feed source, not shown.

Preferably the support surface or bed 12 is fabricated by utilizing a number of I-beams 20, 22, 24 and 26 which are conventially affixed to vertical support I-beams 28, 30, 32 and 34 on one end thereof and support I-beams 36, 38, 40 and 42 on the other end thereof, such that the lower edge 44 of the surface 12 is approximately 1 meter above the ground 46 upon which the solar drying apparatus 10 is to be installed. The upper edge 18 of the bed 12 is positioned at approximately 5 meters above ground 46 such that the angle $\phi$ is preferably at an angle to the horizontal of between 20 and 30 degrees.

The angle $\phi$ is selected after considering the natural angle of repose of the material to be dried. In the illustrated, preferred, embodiment the angle $\phi$ is not adjustable after installation, however, it is not the intention that this invention be limited to such a non-adjustable embodiment. If the inclined surface is planar and the angle $\phi$ is greater than the angle of repose of the material, the material will roll or slide of its own accord down said incline. If the angle $\phi$ is less than the natural angle of repose of the material, the traversing piercing means will control material movement and groom the slope as is desirable. Typically, the materials under consideration for drying usually exhibit angles of repose between 20 and 30 degrees.

It is also to be noted that where the material to be dried is in relatively large quantities, (eg. coal, lignite, etc.) the material itself may be utilized as the bed with the sloped surface being formed by the rake, at an angle less than that of the natural angle of repose of the material.

Figure 3:
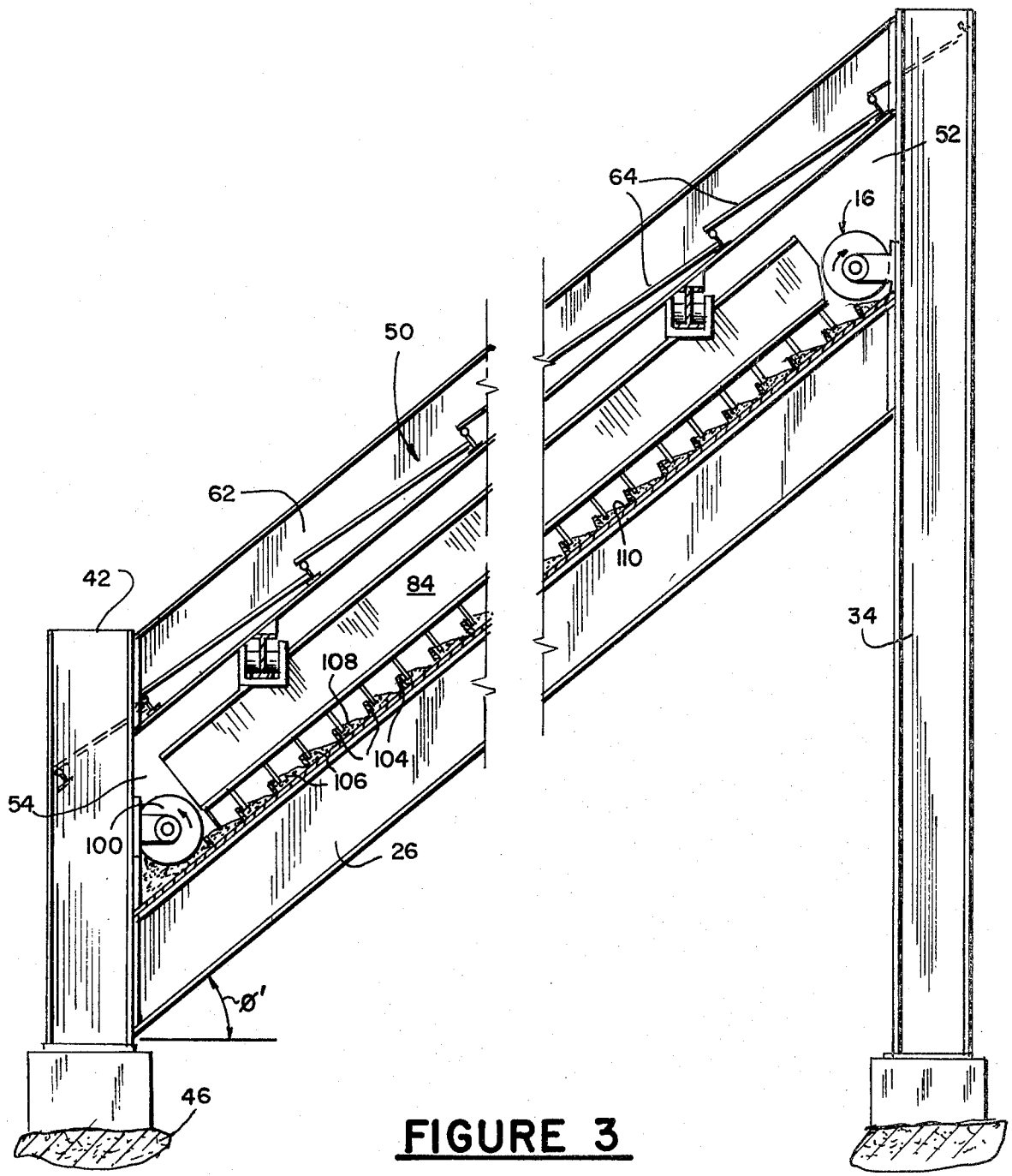
FIG. 3 is a side view in elevation of a further embodiment of the apparatus shown in FIG. 1.

It is desirable to expose materials at an angle more nearly normal to the sun's incident radiation. In the continental United States the optimum angle $\phi$ would vary between 35 and 50 degrees depending on the latitude and the time of the year under consideration. The closer to the equator the smaller would be the optimum value of the angle $\phi$. In order to still control the material movement when the bed is inclined at an angle of inclination greater than the angle of repose of the material to be dried it is necessary to modify the bed to include restraining barriers extending the length of the bed. These barriers preferably are parallel ridges or corrugations which are incorporated into the bed. The ridges 104 are illustrated in FIG. 3 and are preferrably equally spaced along the width of the bed. The ridges 104 create troughs of material 106 such that the surface 108 thereof in each trough is at the natural angle of repose of the material while the overall support surface or bed 110 is at an angle $\phi'$ greater than the angle of repose of the material. To accomplish material movement, the piercing means or rake must move material from each trough to the trough below.

Figure 2:
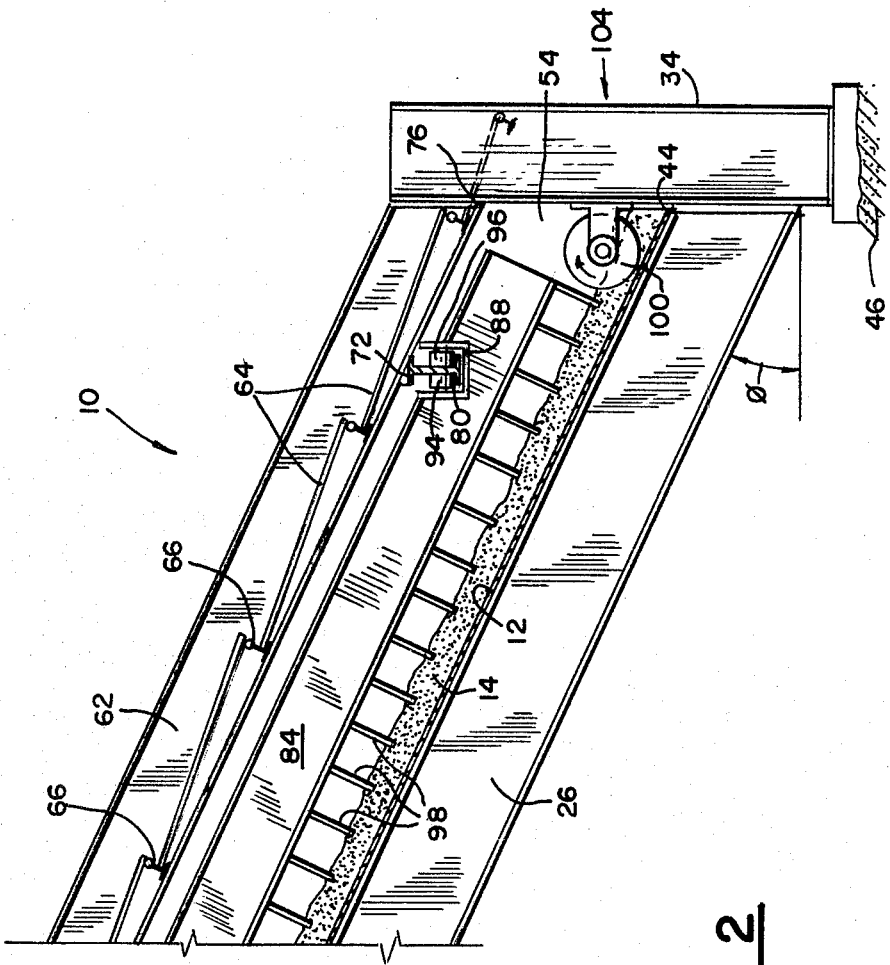
FIG. 2 is a side view in elevation of the apparatus shown in FIG. 1.

The angle $\phi$ of the embodiment shown in FIGS. 1 and 2 is chosen to be below the angle of repose of the materials to be dried so that the material 14 will not freely move down the surface of bed 12.

The preferred length of beams 20, 22, 24, and 26 is 10 meters, while the width of each bay or section between beams is approximately 3 meters. FIG. 1 shows three sections or modules. The length of the bed is determined by the number of bays or modules, while the width of the bed is the distance between the upper edge 18 and the lower edge 44. These two dimensions may vary depending on the dryer capacity needed, the desired material transit time, the initial and final moisture contents required. Although three sections are shown in FIG. 1, it is to be understood that the construction of any number of sections is consistent with the principles described herein.

In the preferred embodiment shown in FIGS. 1 and 2 a cover 50 is provided over the bed 12 and is positioned parallel to and a predetermined distance thereabove. While the cover 50 is substantially parallel to the upper surface of bed 12 in the preferred embodiment, the invention is by no means limited thereto.

The cover 50 is constructed preferably, by utilizing a plurality of beams 56, 58, 60 and 62 affixed to the vertical support beams 28, 30, 32 and 34 on one end and 36, 38, 40, and 42 on the other end in a conventional manner. The cover is fabricated from transparent material which may be glass or plastic and, in the preferred embodiment, are individual sectional pieces 64 which are affixed in transversely running forms 66 that create a shingle-like appearance and serve to block any precipitation from falling on the material to be dried.

The angle to the horizontal of cover 50 may be greater or less than the angle to the horizontal of the support surface. Furthermore, provided that the cover protects the surface to be dried from external precipitation the crosssection of this cover and its angle at any point to the surface of the bed is not of critical importance. Since each of the covering panels 64 are transparent to most of the incoming solar radiation, the wet material beneath the cover absorbs much of this energy facilitating the drying process. Preferably the cover is spaced between 10 to 100 centimeters, most suitably 50 centimeters, from the surface of the bed 12 at its nearest point and the material on the surface of the bed may be as high as 20 centimeters.

Transverse beams 70 and 72 are provided proximate the upper and lower edges 74 and 76, respectively, of the cover 50. The beams 70 and 72 are affixed to the beams 56, 68, 60 and 62 in a conventional manner and are utilized to provide tracks 78 and 80 for a rake 82 to move transverse to the angle of the inclination across the length of the bed 12. The rake 82 spans the distance between tracks 78 and 80 and moves in the same fashion that a light bridge crane moves except that it is disposed at an angle to the horizontal. The rake 82 is preferably fabricated with a beam 84 having an angularly recessed channel 86 and 88 provided therein at both ends. A pair of wheels 90 and 92 are mounted in the side walls of channel 86 in a conventional manner. A second pair of wheels 94 and 96 are also mounted to the side walls of the channel 88. Both sets of wheels are adapted to ride on the lower flange of beams 70 and 72 thereby supporting beam 84 and permitting movement transverse to the angle of inclination of the bed member 12.

Extending downwardly from the beam 84 are a plurality of tines 98 which are spaced along the length of beam 84. The length of the tines 98 are chosen so that they will penetrate the material 14 that is to be dried. The amount that the tines pierce the material 14 may be determined to provide an optimal amount of agitation so that the material will be caused to move down the inclined plane slowly.

Since the angle $\phi$ is less than the angle of repose of the material, the material does not slide down the incline uncontrollably but is nudged incrementally down the slope with each successive pass of the rake.

In the preferred embodiment the rake is pulled automatically by a cable and winch, not shown.

In the preferred embodiment a screw conveyor 100 positioned at the lower edge of the bed 12 removes material from the lower edge of said bed. The screw conveyor is positioned such that the bottom tine of the rake 82 pushes material into the path of the screw conveyor for removal. The dried material 14, upon entering the path of the conveyor 100 along the length of the lower edge 44 is moved to one end thereof where it may be collected by conventional conveyor means, not shown.

In operation, the material to be dried is fed from a source, not shown, to the troughless screw conveyor 16 which distributes the material to the upper edge 44 along the length of the bed. The rake 82 as it traverses the length of the bed grooms the material surface. The uppermost tine of the rake serves to dislodge material distributed by the troughless screw conveyor along the upper edge of the bed. It is characteristic of a troughless screw conveyor that this material is immediately replaced. Each pass of the rake moves the material down incrementally, continuously reexposing wet material to the sun's radiation and the convective airflow. Finally, the last tine of the rake causes the material at the lower edge of the bed to impinge upon the lower screw feeder which carries the dried material away. A transparent cover disposed above the bed of material allows solar radiation to pass through, heating the bed of wet material which facilitates evaporation and convective airflow. The presence of the cover allows for the greenhouse effect and the chimney effect to aid in the evaporative process. Outside air enters opening 54. Contact with the heated material surface causes convective airflow in the direction of arrow 104. This convective air removes the vapor directly adjacent to the wet material surface and exits through opening 52 laden with moisture.

Hereinbefore has been disclosed a method and apparatus for drying granular materials utilizing solar radiation and natural convection on an inclined plane. It will be understood that various changes in the details, materials, arrangement of part, operating conditions which have been herein described and illustrated in order to explain the nature of the invention may be made by those skilled in the art within the principles and scope of the present invention.

Having thus set forth the nature of the invention, what is claimed is:

1. A solar drying apparatus for drying granular materials, sludge, or the like utilizing the sun's rays and convection air currents comprising:

(a) bed means having an upper and a lower edge disposed at an angle from the horizontal for retaining a layer of said material to be dried;

(b) cover means disposed a predetermined amount above said bed means to provide a free flow of said air currents therebetween, said cover means being transparent to said sun's rays; and (c) means disposed between said cover means and said bed means for piercing the upper portion of said material layer and causing said portion of materials to move slowly down the incline of said bed means.

2. A solar drying apparatus according to claim 1 further including:

(d) removing means disposed proximate the lower edge of said bed means for removing the dried material as it appears there; and (e) feed means disposed proximate the upper edge of said bed means for supplying additional wet material thereat as said material moves away therefrom.

3. A solar drying apparatus according to claim 1 wherein said angle from the horizontal is less than the angle of repose of said material to be dried.

4. A solar drying apparatus according to claim 1 wherein said angle from the horizontal is greater than the angle of repose of said material to be dried.

5. A solar drying apparatus according to claim 1 wherein said angle from the horizontal is between 20 and 30 degrees.

6. A solar drying apparatus according to claim 1 wherein said cover means is essentially parallel to said bed means.

7. A solar drying apparatus according to claim 1 wherein said cover means is disposed above said bed means at an angle from the horizontal which is smaller than said bed angle from the horizontal.

8. A solar drying apparatus according to claim 1 wherein said cover means is disposed above said bed means at an angle from the horizontal which is greater than said bed angle from the horizontal.

9. A solar drying apparatus according to claim 1 wherein said cover means is disposed above said bed means between 10 and 100 centimeters.

10. A solar drying apparatus according to claim 1 wherein said material layer is between 5 and 20 centimeters thick.

11. A solar drying apparatus according to claims 1 or 10 wherein said piercing means enters said material to a depth from between 2 and 20 centimeters.

12. A solar drying apparatus according to claim 1 wherein said piercing means moves across said material transverse to the gradient of said bed means.

13. A solar drying apparatus according to claim 1 wherein said piercing means extends from approximately the lower edge of said bed means to approximately the upper edge thereof.

14. A solar drying apparatus according to claim 1 wherein said piercing means is automatically drawn across said material transverse to the gradient of said bed means at pedetermined time intervals.

15. A solar drying apparatus according to claim 2 wherein said said feed is a troughless screw conveyor.

16. A solar drying apparatus in accordance with claim 1 wherein said bed means comprises the said material to be dried.

17. A solar drying apparatus in accordance with claim 4 wherein said bed means includes a plurality of ridges extending the length thereof for retaining material therebehind.

18. A solar drying apparatus in accordance with claim 17 wherein said ridges are equally spaced along the width of said bed.

19. A solar drying apparatus in accordance with claim 17 wherein said piercing means pierces the material behind each of said ridges and causes said material to move to said ridge therebelow as said piercing means is moved.

20. A solar drying apparatus in accordance with claim 4 wherein said bed means includes a plurality of equally spaced undulations extending the length thereof for retaining material therein, one undulation being provided for each said piercing means.

21. A solar drying apparatus according to claim 1 further including the addition of auxiliary heating means applied to the underside of said bed means.

22. A solar drying apparatus according to claim 1 wherein said bed means is formed from said material to be dried disposed at an angle less than its natural angle of repose.

23. A process for drying granular materials,
   (a) supporting a material to be dried at an angle from the horizontal on a support surface;
   (b) covering the said material with a transparent cover disposed above said support surface;
   (c) feeding material to be dried to the upper edge of said support surface;
   (d) piercing said material with a piercing means disposed between said transparent cover and said support surface;
   (e) removing said material from the lower edge of said support surface.

24. A process according to claim 15 wherein said support surface is at an angle from the horizontal which is less than the angle of respose of the material to be dried.

25. A process according to claim 15 wherein said support surface is disposed at an angle from the horizontal which is greater than the angle of respose of the material to be dried.

* * * * *